Patented Apr. 5, 1938

2,113,193

UNITED STATES PATENT OFFICE 2,113,193

LIGHT SENSITIVE LAYER AND METHOD OF MAKING SAME

Jan Hendrik de Boer, Eindhoven, Netherlands, assignor to N. V. Philips' Gloeilampenfabrieken, Eindhoven, Netherlands No Drawing. Application December 26, 1934, Serial No. 759,315. In Germany October 10, 1934

8 Claims. (Cl. 95—6)

It is possible to prepare a sensitized layer containing a diazonium compound, a colouring material component and, in some cases, an alkaline substance by applying to a carrier in a pulverulent state at least one substance assisting in the formation of colouring material so as to avoid untimely formation of colouring material.

The term "colouring material component" as used herein is to be understood to mean a compound capable of reacting with the diazonium compound also present on or in the carrier to form a colouring material in the presence of a sufficient proportion of water, and if necessary with the assistance of an alkaline substance. As colouring material components, use may be made, for example, of materials having a phenol or amino-group and coupling with a diazonium compound to form a so-called azo-dyestuff or of materials which are capable of being oxidized by a diazonium compound to form a coloured compound. The colouring material component may be applied to the carrier as such or may be formed in or on the carrier from another compound, for example by the photochemical decomposition of a diazonium compound. The method described is well adapted for preparing sensitized layers having the property of "self-colouring". By "self-colouring" is meant the property by which development may be effected after the exposure merely by the action of water vapour or steam, an intensive colour being produced on unexposed parts and no colour or hardly any colour being produced on intensely exposed parts without the subsequent addition or removal of a further substance for the purpose of fixing.

The invention has for its object to improve the method hereinbefore described and is characterized in that at least one of the substances assisting in the production of colouring material, as well as a substance that does not assist in the production of colouring material, are applied to the carrier in a pulverulent state.

Preferably, as a substance that does not assist in the formation of colouring material, I use a substance which is capable of absorbing moisture from the atmosphere while retaining its powdery state.

The invention permits of obtaining a greater durability of the unexposed layers. It thus renders possible a wider choice of the various combinations of diazonium compounds and colouring material components, especially in the case of layers that are particularly sensitive to the humidity of the atmosphere.

In order that the invention may be clearly understood and readily carried into effect two embodiments thereof will now be set out more fully by way of example.

Example I

Paper is painted with a 1% aqueous solution of the zinc chloride double salt of paradiphenylaminodiazoniumchloride, dried, rubbed in with rice meal, and finally dusted with a very fine powder of $\alpha$ naphthol. It is even advantageous to rub in with a mixture of rice meal and $\alpha$ naphthol in a pulverulent state. This avoids any danger of the $\alpha$ naphthol particles conglomerating. The sensitized layer thus obtained can be developed merely with steam, but development with an alkali is also possible.

Example II

Paper is painted with a 1% aqueous solution of 4-dimethylaminobenzenediazoniumboric fluoride and dried. The carrier is then rubbed in with a pulverulent mixture of rice meal, phloroglucin and anhydrous soda.

It is also possible, after the said drying operation, to rub-in the carrier first with a pulverulent mixture of rice meal and anhydrous soda, and then to dust it with a very fine powder of phloroglucin.

As an alternative, the carrier may first be dusted with a pulverulent mixture of phloroglucin and rice meal and then be rubbed in with anhydrous soda in a pulverulent state. The sensitized layer thus obtained has the described property of "self-colouring".

What I claim is:

1. In the method of producing contrasts, the steps which comprise, applying to a carrier a diazonium compound component and a coloring component capable of reacting in the presence of moisture to form coloring material, at least the last-applied component being applied as a powder to the dried carrier, applying to the carrier to prevent premature formation of coloring material a photochemically-inert powder which is inert with respect to said components and has the property of absorbing moisture from the atmosphere while retaining its powdery state, selectively exposing the so-formed layer, and developing after the exposure the contrasts without the addition or removal of any chemical substance by subjecting the exposed layer to moisture.

2. A light-sensitive layer comprising a diazonium compound component, a coloring component capable of reacting with the diazonium compound in the presence of moisture, said components being present in a substantially dry state and being capable of image formation after exposure to light from a subject merely by the action of moisture and without the addition or removal of any chemical substance, and means to prevent premature coupling of said components comprising a photochemically-inert powdery substance capable of absorbing moisture from the atmosphere while remaining in its powdery state, said substance being inert with respect to said components.

3. A light-sensitive layer comprising a diazonium compound component, a coloring component, an alkaline-reacting substance, said components and substance being present in a substantially dry state and said layer being capable of image formation after exposure to light merely by the action of moisture and without the addition or removal of any chemical substance, and means to prevent premature color formation comprising a photochemically inert powdery substance capable of absorbing moisture from the atmosphere while retaining its powdery state and inert with respect to said components and alkaline-reacting substance.

4. A light-sensitive layer comprising a diazonium compound component, a coloring component, an alkaline-reacting substance, said substance being in a powdery form, said components and substance being present in a substantially dry state and said layer being capable of image formation after exposure to light merely by the action of moisture and without the addition or removal of any chemical substance, and means to prevent premature color formation comprising a photo-chemically inert powdery substance capable of absorbing moisture from the atmosphere while retaining its powdery state and inert with respect to said components and alkaline-reacting substance.

5. A light-sensitive layer comprising a diazonium compound, a coloring component, said compound and component being present in a substantially dry state and being capable of image development after exposure to light from a subject merely by the action of moisture and without the addition or removal of any chemical substance, and a starchy powder capable of absorbing moisture from the atmosphere while remaining in its powdery state.

6. A light-sensitive layer comprising a diazonium compound, a coloring component capable of reacting with the diazonium compound in the presence of moisture, said compound and component being present in a substantially dry state and being capable of image formation after exposure to light from a subject merely by the action of moisture and without the addition or removal of any chemical substance, and rice meal.

7. In the method of producing contrasts, the steps which comprise, applying to a carrier a diazonium compound component and a coloring component capable of reacting in the presence of moisture to form coloring material, at least the last-applied of said components being applied as a powder to the dried carrier, applying to the carrier to prevent premature formation of coloring material a photochemically-inert starchy powder which is inert with respect to said components and has the property of absorbing moisture from the atmosphere while retaining its powdery state, selectively exposing the so-formed layer, and developing after the exposure the contrasts without the addition or removal of any chemical substance by subjecting the exposed layer to moisture.

8. In the method of producing contrasts, the steps which comprise, applying to a carrier a diazonium compound component and a coloring compound component capable of reacting in the presence of moisture and an alkaline-reacting substance to form coloring material, at least the last-applied of said components being applied as a powder to the dried carrier, applying to the carrier a powdery alkaline-reacting substance, applying to the carrier to prevent premature formation of coloring material a photochemically-inert powder which is inert with respect to said components and has the property of absorbing moisture from the atmosphere while retaining its powdery state, selectively exposing the so-formed layer, and developing after the exposure the contrasts without the addition or removal of any chemical substance by subjecting the exposed layer to moisture.

JAN HENDRIK DE BOER.